United States Patent [19]
Takeyama et al.

[11] Patent Number: 5,294,944
[45] Date of Patent: Mar. 15, 1994

[54] COLOR IMAGE FORMING APPARATUS HAVING MEANS FOR PROPERLY SUPERIMPOSING IMAGE COLORS ON EACH OTHER

[75] Inventors: Yoshinobu Takeyama, Kawasaki; Nobuaki Kubo, Urawa; Susumu Imakawa, Yokohama; Norio Michiie, Tokyo, all of Japan

[73] Assignee: Ricoh Company, Ltd., Tokyo, Japan

[21] Appl. No.: 842,526

[22] Filed: Feb. 26, 1992

[30] Foreign Application Priority Data

| | | |
|---|---|---|
| Mar. 6, 1991 [JP] | Japan | 3-39679 |
| Mar. 8, 1991 [JP] | Japan | 3-43056 |
| Mar. 8, 1991 [JP] | Japan | 3-43057 |

[51] Int. Cl.⁵ .............................. H04N 1/21
[52] U.S. Cl. ..................... 346/108; 358/505
[58] Field of Search .......... 346/108, 107 R, 76 L, 346/1.1, 160; 358/75, 80, 78

[56] References Cited

U.S. PATENT DOCUMENTS

| | | | |
|---|---|---|---|
| 4,841,137 | 6/1989 | Mochizuki | 346/108 |
| 4,978,976 | 12/1990 | Okino | 346/108 |
| 5,006,705 | 4/1991 | Saito et al. | 346/108 |

FOREIGN PATENT DOCUMENTS

0019764 2/1982 Japan ....................... G03G 15/01

*Primary Examiner*—Mark J. Reinhart
*Attorney, Agent, or Firm*—Cooper & Dunham

[57] ABSTRACT

An image forming apparatus using a plurality of laser beams having the same characteristic in order to form a predetermined color image. The predetermined color image consists of a plurality of image colors. The laser beams are shifted with respect to each other in a vertical scanning direction by a diameter of each laser beam divided by the number of the laser beams. Since a rotating of a polygon mirror which deflects the laser beams is asynchronous with a rotating of a photosensitive body on which each laser beam is radiated so as to form a latent image, image colors are shifted with respect to each other. According to the present invention, one of the laser beams is selected for each image color, based on a timing difference between the polygon mirror and the photosensitive body, so that image colors can be superimposed on each other.

8 Claims, 9 Drawing Sheets

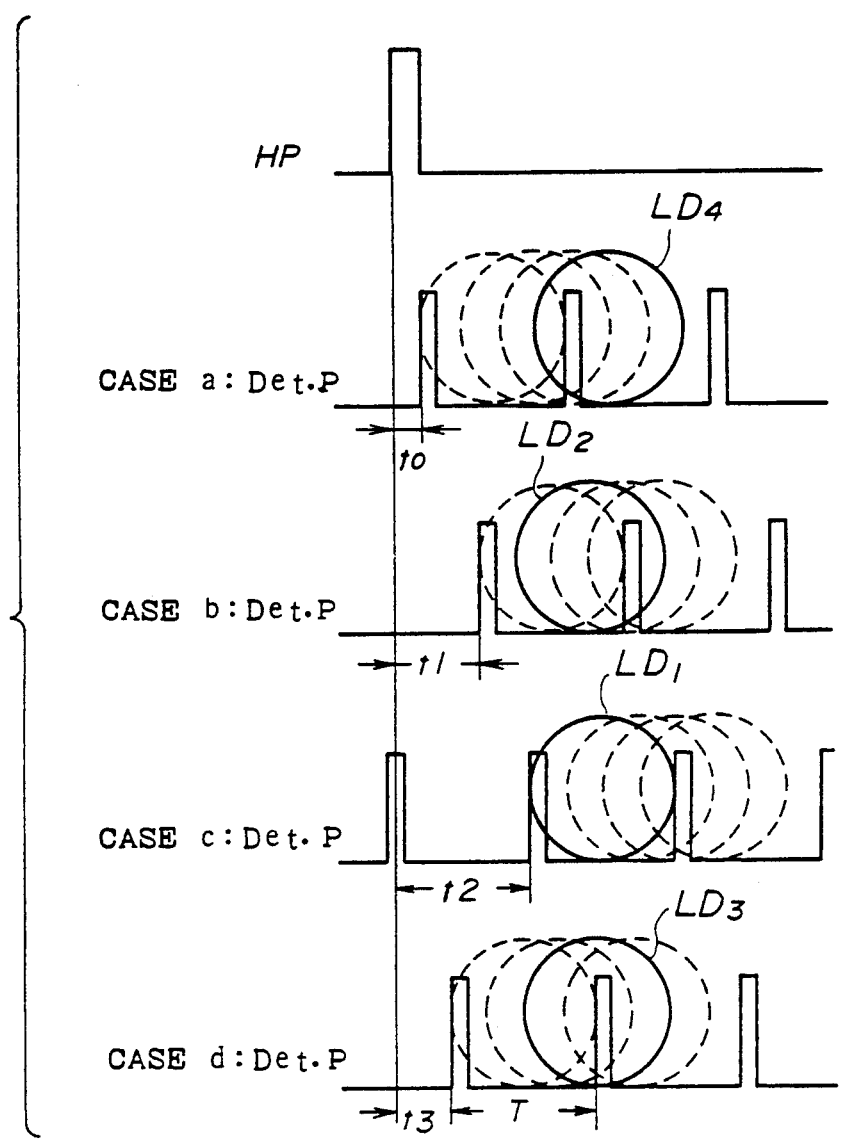

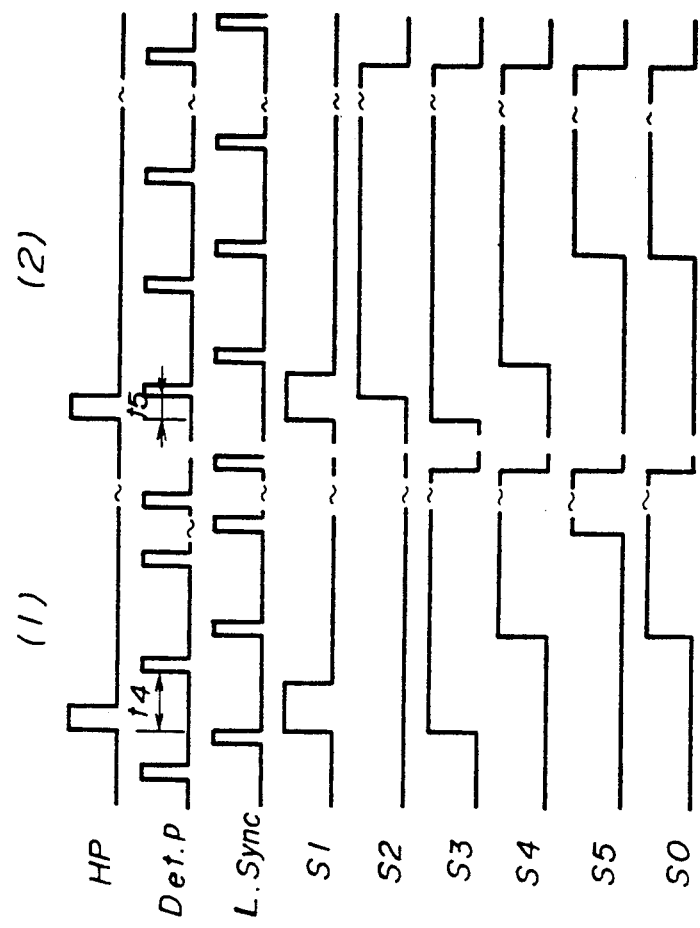

COLOR IMAGE FORMING APPARATUS HAVING MEANS FOR PROPERLY SUPERIMPOSING IMAGE COLORS ON EACH OTHER

BACKGROUND OF THE INVENTION

The present invention relates to image forming apparatuses, such as a laser printer, a digital copier, etc., which generate a color image.

In a general conventional image forming apparatus a laser beam, representing a predetermined image, is reflected on a rotating polygon mirror and then radiated to a rotating photosensitive body to form a latent image thereon. The photosensitive body is then charged with electricity, and the latent image thereon is developed and transferred onto a piece of recording paper via a transfer charger. The above process is repeated for each image color, and thus each image color is superimposed on the paper. Hereupon, the photosensitive body rotates indifferent to the input of the laser beam transmitted to it from the rotating polygon mirror, and to properly form the latent image on the photosensitive body, it is desirable to synchronize the rotation of the photosensitive body with the input of the laser beam transmitted thereto. However, an image forming apparatus having such a synchronizer shown in Japanese Laid-Open Patent Application No.57-19764 has a complicated circuitry construction and is expensive. On the other hand, without such a synchronizer, the rotation of the photosensitive body cannot be completely synchronous with the input of the laser beam and the image colors cannot be completely superimposed on each other. Thus, the image colors are shifted with respect to each other by at worst one dot, even if a recording timing of the laser beam, at which timing the laser beam is radiated on the photosensitive body, is controlled based on a position signal of the photosensitive body. In addition, a dot position of an end of a line cannot be always constant

SUMMARY OF THE INVENTION

Accordingly, it is a general object of the present invention to provide a novel and useful image forming apparatus in which the above disadvantages are eliminated.

Another more specific object of the present invention is to provide a small and inexpensive image forming apparatus which forms a color image with a high image quality.

According to one feature of the present invention, an image forming apparatus comprises scanner means, using a plurality of laser beams having the same characteristic, for scanning a predetermined color image, each of the laser beams representing the predetermined color image and being shifted with respect to each other in a vertical scanning direction by a first pitch, the first pitch being defined by dividing a diameter of each of the laser beams by the number of the laser beams, an optical recording system including a rotating polygon mirror which deflects each of the laser beams, a body system including a rotating photosensitive body onto which each laser beam deflected by the rotating polygon mirror is radiated so as to form a latent image corresponding to the predetermined color image, and selecting means for selecting one of the laser beams of the scanner means based on a time difference between a position detecting signal and a position signal, the position detecting signal indicating that each laser beam is ready to be radiated onto the photosensitive body of the body system, the position signal indicating that the photosensitive body is located at a position where each laser beam can be properly radiated thereon, and the position detecting signal being asynchronous with the position signal.

According to another feature of the present invention, an image forming apparatus comprises scanner means for scanning each line of a predetermined color image and for generating an image data representing the predetermined color image by means of a laser beam, the predetermined color image comprising a plurality of image colors, an optical recording system including a rotating polygon mirror which deflects the laser beam, a body system including a rotating photosensitive body onto which the laser beam deflected by the rotating polygon mirror is radiated so as to form a latent image corresponding to the predetermined color image, buffer means for storing at least three lines of the image data, a first line of image data being stored twice, and switch means, coupled to the body system, for determining, based on a time difference between a position detecting signal and a position signal, whether or not the first line of image data is output twice to the body system, and for outputting each line of image data to the body system so that the image colors can be approximately superimposed to each other, the position detecting signal indicating that the laser beam is ready to be radiated onto the photosensitive body of the body system, the position signal indicating that the photosensitive body is located at a position where the laser beam can be properly radiated thereon, and the position detecting signal being asynchronous with the position signal.

According to one aspect of the present invention, a color deviation in the vertical scanning direction is corrected by selecting one laser beam from among the plurality of laser beams and thus the image quality can be improved. According to another aspect of the present invention, since the first line of image data is temporarily stored twice and is output once or twice to be recorded on the photosensitive body, the image colors are superimposed on each other. In addition, a color deviation in the vertical scanning direction can be corrected.

Other objects and further features of the present invention will become apparent, from the following detailed description, when read in conjunction with the accompanying drawings.

BRIEF DESCRIPTION OF THE DRAWINGS

FIG. 2 shows a timing chart for explaining an operational principle performed by the image forming apparatus;

FIG. 15 shows a timing chart of the operation of the recording timing generating circuit shown in FIG. 14.

DETAILED DESCRIPTION OF THE PREFERRED EMBODIMENTS

Figure 1:
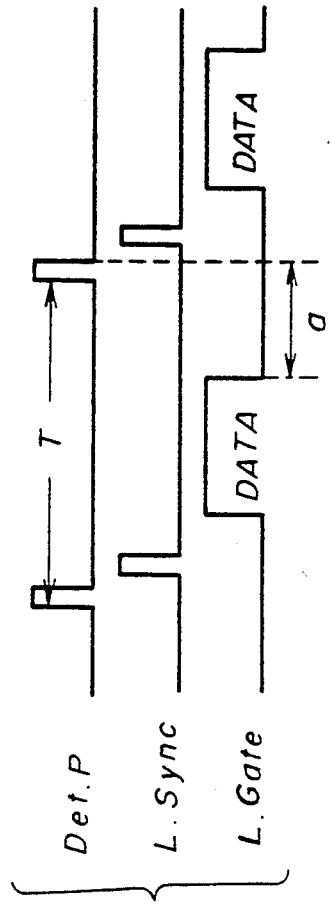
FIG. 1 shows a timing chart of a basic operation of an optical recording system of an image forming apparatus of a first embodiment according to the present invention.

A description will now be given of a basic operation of an optical recording system including a rotating polygon mirror that deflects a laser beam representing each line of optical image corresponding to a predetermined color image. Referring to FIG. 1, a position detecting signal (Det.P), having a period T, indicates that the laser beam is ready to be radiated on the photosensitive body. A line synchronization signal (L.Sync), representing a start point of each line of the optical image, indicates that the laser beam can actually be radiated on the photosensitive body. A data signal (L.Gate) represents the optical image to be recorded on the photosensitive body. Incidentally, during period "a" shown in FIG. 1, a laser diode which generates the laser beam is lit, so that the power thereof is controlled and/or the position detecting signal (Det.P) is generated. The position detecting signal (Det.P), line synchronization signal (L.Sync), and data signal (L.Gate) are generated asynchronously with a reference signal of the photosensitive body, the reference signal representing a rotating timing of the photosensitive body, even if a speed of a polygon mirror becomes constant. A reference signal of a body system including the photosensitive body, transfer charger etc., is referred to as a position signal (HP) corresponding to the reference signal of the photosensitive body. The position signal (HP) is generated for each page of image color.

A description will now be given of the relationship between the position detecting signal (Det.P) and the position signal (HP). Since the position signal (HP) is asynchronous with the position detecting signal (Det.P), an offset occurs therebetween. Since the predetermined color image comprises a plurality of image colors, a plurality of records are needed to form the image. Each offset represents a header position of each image color at a first line on a first page in a vertical scanning direction. Thus, due to the asynchronization between the signals (HP) and (Det.P), the offsets of the image colors are occasionally different from each other, so that the image colors cannot be superimposed on each other and the image quality is deteriorated. To improve the image quality, it is desirable to make each offset constant for each image color. However, it is difficult to do this. Accordingly, the present invention makes the respective offsets approximately equal to each other within an error of 1/n dot (n is the number of laser beams). Next follows a description of the principle of the present invention in which four laser beams are used (n=4).

Four laser beams are generated from a laser diode 1 having four laser diode components therein, all the laser diode components having the same characteristic. Each laser beam output from each laser diode component represents the predetermined image, namely, all image colors. The offset between the position detecting signal (Det.P) and position signal (HP) has a value from zero to one period T. Now that the number of laser beams is four, four offsets $t_0$ through $t_3$ are considered, as shown in FIG. 2; $0 \leq t_0 \leq T/4$ for case "a", $T/2 < t_1 \leq 3T/4$ for case "b", $3T/4 < t_2 \leq T$ for case "c", and $T/4 < t_3 \leq T/2$ for case "d".

Figure 3:
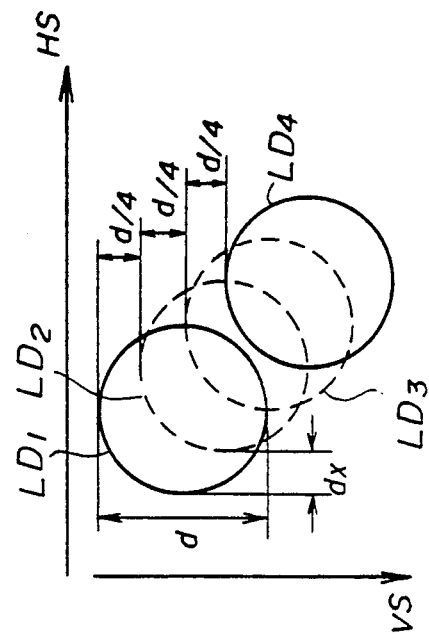
FIG. 3 shows an optical configuration of four laser beams used for the image forming apparatus.

According to the present invention, laser beams are shifted with respect to each other by a predetermined pitch in a vertical scanning direction. In this embodiment, as shown in FIG. 3, laser beams are shifted with respect to each other by d/4 in a horizontal scanning direction (HS), and by $dx(=d/4)$ in a vertical scanning direction (VS), "d" being a diameter of each laser beam. The reason why each laser beam is shifted will be explained later.

One of the four laser beams to be radiated onto the photosensitive body is selected based on the offset. Referring to FIG. 2, if the offset is $t_0$, the laser beam $LD_4$ is selected. If the offset is $t_1$, the laser beam $LD_2$ is selected. If the offset is $t_2$, the laser beam $LD_1$ is selected. If the offset is $t_3$, the laser beam $LD_3$ is selected. The selected laser beam, indicated by a real line in each of the cases "a" to "d", is located at approximately the same position within an error of ¼ dot. This because: in case "a", since $0 \leq t_0 \leq T/4$ and an offset between the laser beams $LD_1$ and $LD_4$ is a 3d/4 dot which corresponds to 3T/4, an offset between the position signal (HP) and the laser beam $LD_4$ can be regarded as T; in case "b", since $T/2 < t_1 \leq 3T/4$ and an offset between the laser beams $LD_1$ and $LD_2$ is a d/4 dot which corresponds to T/4, an offset between the position signal (HP) and the laser beam $LD_2$ can be regarded as T; in case "c", since $3T/4 < t_2 \leq T$, an offset between the position signal (HP) and the laser beam $LD_1$ can be regarded as T; and in case "d", since $T/4 < t_3 \leq T/2$ and an offset between the laser beams $LD_1$ and $LD_3$ is a d/2 dot which corresponds to T/2, an offset between the position signal (HP) and the laser beam $LD_3$ can be regarded as T.

After the position signal (HP) is generated and the line synchronization signal (L.Sync) is detected, one page of image color is recorded by means of the selected laser beam. The above procedure is performed for each image color. Thus, each image color can be approximately superimposed and thus the image quality is improved. The more laser beams are used, the more improved the image quality becomes. Generally speaking, the image quality of the recorded image has an error of 1/(the number of laser beams) dot in the vertical scanning direction.

Figure 4:
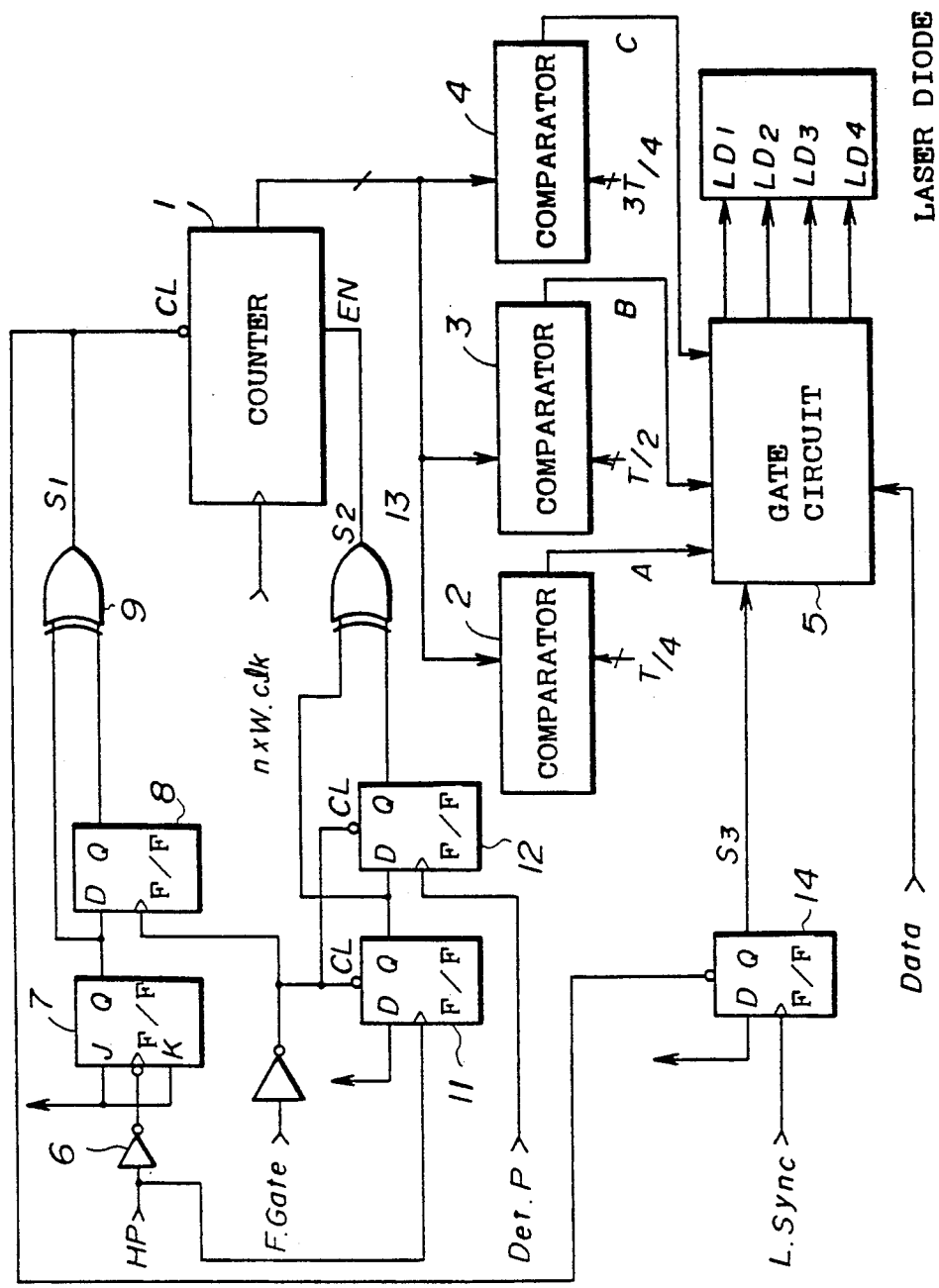
FIG. 4 shows an example of a block diagram of a part of the image forming apparatus which performs the operational principle shown in FIG. 2.

FIG. 4 shows one example of a circuit which achieves the principle of the present invention shown in FIG. 2. A counter 1 starts to count the number of clocks (w.clk) from when it enters a clear mode responsive to the position signal (HP) to when it enters an enable mode responsive to the position detecting signal (Det.P), the clock (w.clk) being generated by dividing a pixel clock. Thus, the counter 1 detects a time difference between the position signal (HP) and the position detecting signal (Det.P). An output of the counter 1 is supplied to three comparators 2, 3 and 4. A number of comparators is determined by subtracting a number of laser beams from 1. The comparator 2 has a threshold of T/4, the comparator 3 has a threshold of T/2, and the comparator 4 has a threshold of 3T/4 Each of the comparators 2, 3 and 4 compares, bit by bit, an output of the counter 1 with its threshold. A gate circuit 5 selects, based on outputs of the comparators 2, 3 and 4, one of the laser beams $LD_1$ to $LD_4$ in the laser diode.

Concretely, the position signal (HP) is input as a signal $S_1$ to the counter 1 via a J-K type flip-flop (F/F) 7, a D-type flip-flop 8, and an exclusive OR circuit 9. Hereupon, a signal (F.Gate) designating a number of lines to be recorded on one page is input to the flip-flop 8 via an inverter. The position signal (HP) is input as a signal $S_2$ to the counter 1 via D-type flip-flops 11 and 12, and an exclusive OR circuit 13. In addition, each of the comparators 2, 3 and 4 receives an output bit generated by dividing each threshold thereof by n*w.clk. A D-type flip-flop 14, which enters an enable mode responsive to the position signal (HP), actuates the gate circuit 5 via a signal $S_3$ in response to the line synchronization signal (L.Sync).

In operation, when the position signal (HP) is generated, the signals $S_1$ and $S_2$ respectively become H level and the counter 1 starts to count the number of clocks. When the position detecting signal (Det.P) is generated, an output Q of the flip-flop 12 becomes H level and thus the signal $S_2$ becomes L level. Thus, the counter 1 stops counting to hold the time difference between the position signal (HP) and the position detecting signal (Det.P) to output it to the respective comparators 2, 3 and 4. Each of these comparators 2, 3 and 4 respectively compares, bit by bit, the output of the counter 1 with its thresholds, and outputs the result to the gate circuits 5.

Incidentally, when the signal $S_1$ becomes H level, the flip-flop 4 becomes the enable mode, and thus the signal $S_3$ enters H level in synchronism with the first line synchronization (L.Sync) after the position signal (HP) is generated. The gate circuit 5 receives the signal $S_3$, and selects one of the laser beams $LD_1$ to $LD_4$ based on the output of the comparators 2, 3 and 4.

The following table depicts the relationship between the time difference "t" output from the counter 1 and the outputs A, B and C of the respective comparators 2, 3 and 4:

| TIME DIFFERENCE t | A | B | C |
|---|---|---|---|
| $0 \leq t \leq T/4$ | L | L | L |
| $T/4 < t \leq T/2$ | H | L | L |
| $T/2 < t \leq 3T/4$ | H | H | L |
| $3T/4 < t$ | H | H | H |

Figure 5:
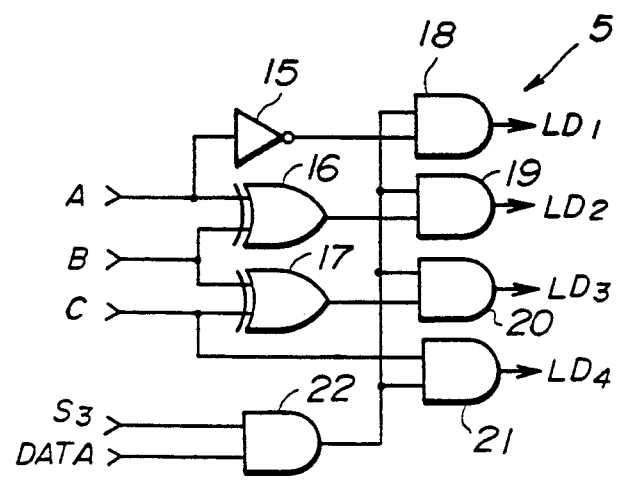
FIG. 5 shows an example of a logic circuitry construction of a gate circuit shown in FIG. 4.

The gate circuit 5 may comprise, as shown in FIG. 5, an inverter 15, exclusive OR circuits 16 and 17, and AND circuits 18 to 22, the AND circuit 22 receiving the signal $S_3$ and optical image.

When the signal (F.Gate) enters H level, the flip-flops 11 and 12 respectively enter clear modes, whereas, when the signal (F.Gate) becomes L level, the flip-flop 8 becomes H level and thus the signal $S_1$ becomes L level. When the signal $S_1$ becomes L level, the signal $S_3$ becomes L level and an output of the AND circuit 22 becomes L level. The signal (F.Gate) is generated, simultaneously with the signal $S_3$, by a circuit (not shown) which counts trailing edges of the line synchronization signal (L.Sync).

The above procedure is repeated for second and subsequent records.

Generally speaking, in a case where "n" represents a number of the laser beams and "t" represents a time difference between the signals (HP) and (Det.P), if $n < T/n$, a n-th laser beam (located at a farthest place in the vertical scanning direction, like the laser beam $LD_4$ shown in FIG. 3) is selected. If $T/n \leq t < (n-1)T/n$, a $[(n-x)+1]$-th laser beam ($t = xT/n$, $x = 1, \ldots, n-2$) is selected. If $t \geq (n-1)T/n$, a first laser beam is selected. Thus, the color deviation in the vertical scanning direction can be restricted within an error of 1/n dot.

Figure 6:
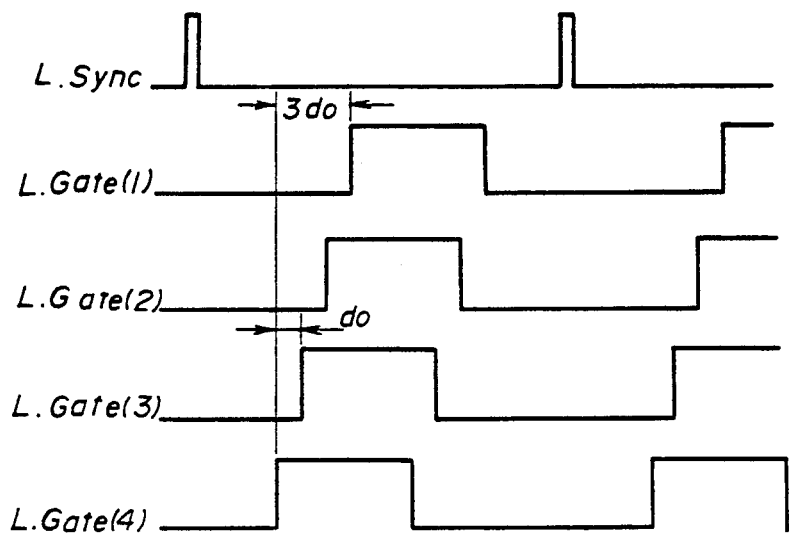
FIG. 6 shows a timing chart for explaining a recording timing of each laser beam shown in FIG. 3.

Next follows a description of how to correct the color deviation in the horizontal scanning direction. Since the time difference between the data signal (L.Gate) and the position detecting signal (Det.P) is not constant, image colors are shifted with respect to each other in the horizontal scanning direction as well as in the vertical scanning direction. As shown in FIG. 6, the data signal (L.Gate) is set for each of the laser beams $LD_1$ to $LD_4$. That is, when the laser beam $LD_1$ is to be selected, data is recorded in accordance with the data signal (L.Gate(1)). When the laser beam $LD_3$ is to be selected, data is recorded in accordance with the signal (L.Gate(3)). Incidentally, a delay time $d_0$ in each of the data signals (L.Gate) is used to correct the pitch dx shown in FIG. 3.

Figure 8:
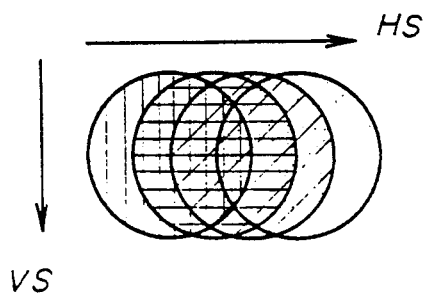
FIG. 8 shows an example of a result of the other operational principle.
Figure 7:
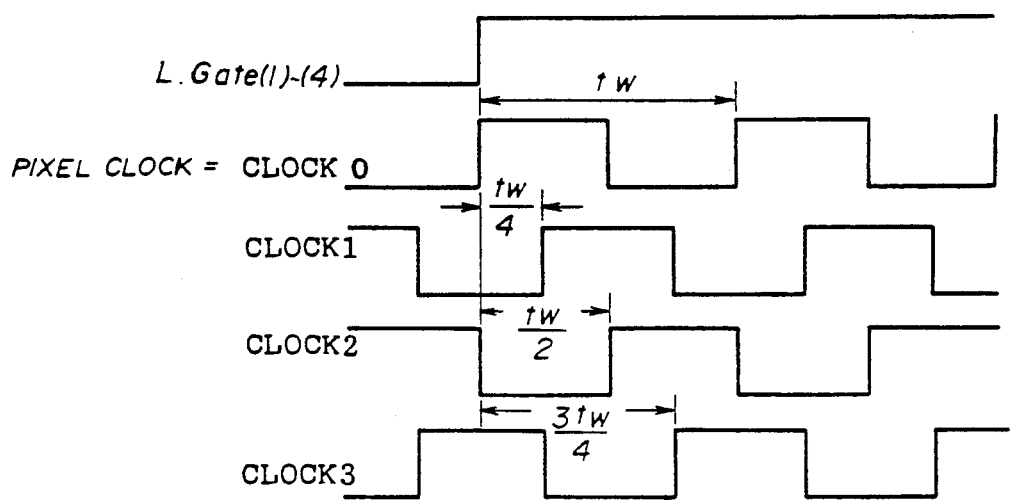
FIG. 7 shows a timing chart for explaining another operational principle of the image forming apparatus.

A dot position varies within each recording timing. A timing control is performed, as shown in FIG. 7. Each of the data signals (L.Gate(1) to L.Gate(4)) is generated in synchronism with a pixel clock (clock 0) having a period tw, and then other clocks 1, 2 and 3, whose phases are delayed from that of the clock 0 by a reciprocal of a number of the laser beams, namely, tw/4, are generated. The pixel clock is generally determined by the recording density of an original image. Each data is latched and digitalized at the trailing edges of these clocks. The clocks are selected, by taking a process condition, a recording density and color data into consideration, so that optimal color matching is performed. The process condition means, for example, an optical sensitivity in accordance with an oscillation wave length of the laser diode. The color data is a kind of color, such as cyanogen and magenta, etc. For example, as shown in FIG. 8, a first color (vertical line pattern) for the clock 0, a second color (horizontal line pattern) for the clock 1, a third color (oblique line pattern) for the clock 2, and a fourth color (scattered points pattern) for the clock 3.

Figure 9:
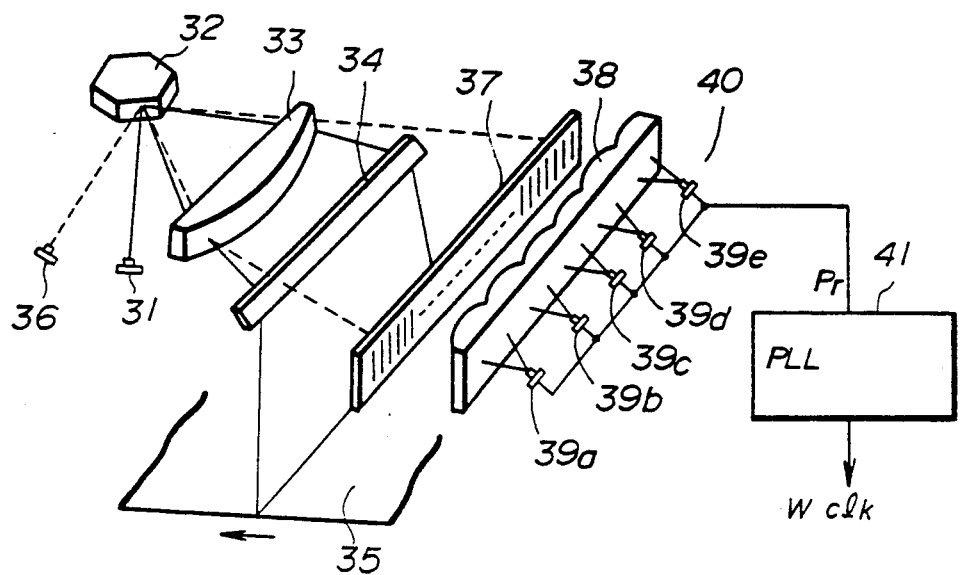
FIG. 9 shows an example of a perspective view of an essential part of the image forming apparatus.
Figure 10:
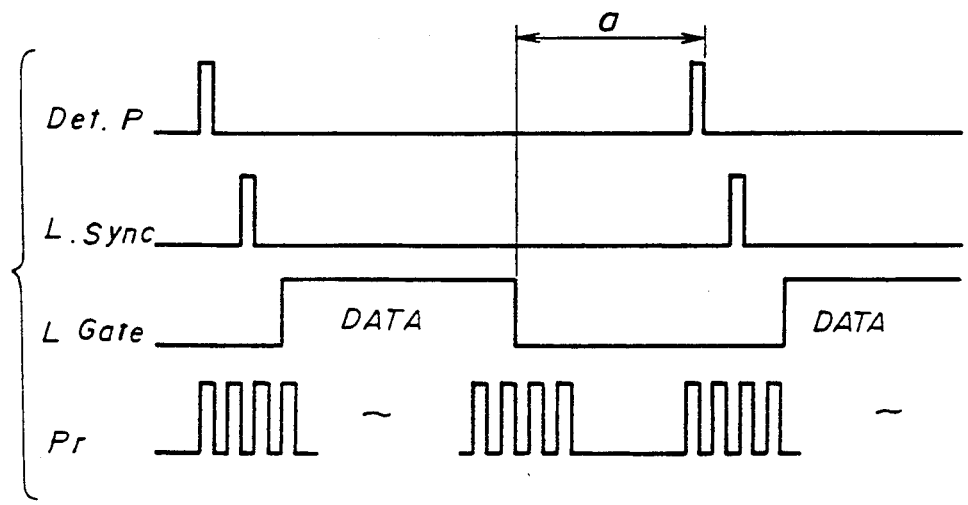
FIG. 10 shows a timing chart of a basic operation using a clock generated by the image forming apparatus shown in FIG. 9.

An image forming apparatus according to the present invention may be comprised as shown in FIG. 9. In FIG. 9, the image forming apparatus uses a grating 37 with a plurality of slits. Numeral 31 denotes a laser diode used to record a predetermined color image, numeral 32 denotes a polygon mirror, numeral 33 denotes a $f\theta$ lens, numeral 34 denotes a mirror, numeral 35 denotes a photosensitive body, numeral 36 denotes another laser diode used to generate a synchronizing reference pulse, numeral 40 denotes pulse-generating means, and numeral 41 denotes a phase-locked loop (PLL) circuit. According to this embodiment, the laser diode 31 includes a plurality of laser diode components for generating a plurality of laser beams representing the predetermined color image. The pulse-generating means 40 comprises the grating 37, a lens array 38, and five light-receiving elements 39a to 39e. Each laser beam output from the laser diode 31 is deflected on the rotary polygon mirror 32, transmitted through the fθ lens 33, reflected on the mirror 34, and then radiated on the photosensitive body 35. The laser beam output from the laser diode 36 is incident onto the polygon mirror 2 at a position which is the same as that of the laser beam output from the laser diode 31 in the horizontal scanning direction but different from that of the laser beam output from the laser diode 31 in the vertical scanning direction by a predetermined interval. Thus, the laser beam output from the laser diode 36 is also deflected on the polygon mirror 32, and transmitted through the fθ lens 3 and the mirror 34 to scan the grating 37. The laser beam transmitted through the grating 37 is received by the plurality of light-receiving elements 39a to 39e via the lens array 38 to form a phase synchronizing reference pulse Pr, which is intermittent as shown in FIG. 10. The reference pulse Pr is input to the PLL circuit 41 to form a pixel clock (w.clk) which is synchronous with and has a frequency "n" times as high as the reference pulse Pr. When the laser beam $LD_1$ is modulated based on the predetermined color image and the pixel clock (w.clk), a dot deviation at the end of a line of the recorded image can be reduced. According to the embodiment, the first pulse of the reference pulse Pr is used for the position detecting signal (Det.P).

Figure 11:
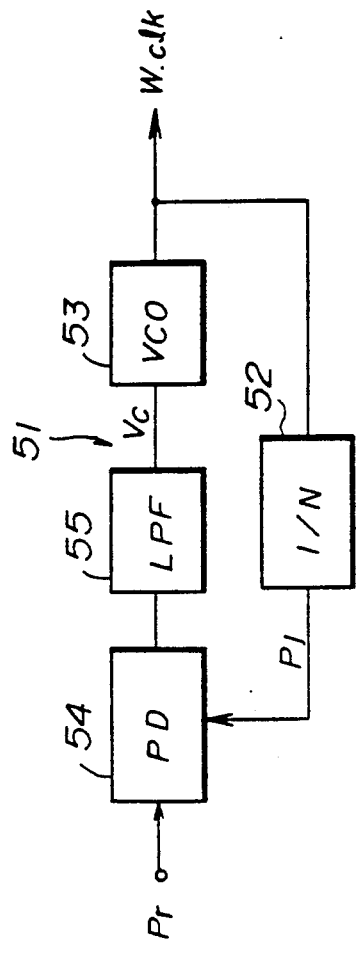
FIG. 11 shows a block diagram of a phase-locked loop circuit shown in FIG. 9.

The PLL circuit 41 comprises, as shown in FIG. 11, a divider 52, a voltage controlled oscillator (VCO) 53, a phase comparator (PD) 54, and a lowpass filter (LPF) 55 which are connected as shown. The reference pulse Pr is supplied to the phase comparator 54 which compares the phase of the reference pulse Pr with that of a feedback signal $P_1$. The feedback signal $P_1$ is output from the divider 52 which frequency-divides an output of the voltage controlled oscillator 53 by N (that is, multiplies by 1/N). The comparison result is supplied from the phase comparator 54 to the lowpass filter 55 which eliminates unwanted noise and high-frequency components. An output of the lowpass filter 55 is amplified by an amplifier (not shown), and input to the voltage control oscillator 53. Hence, the feedback control is carried out so as to match the phase of the reference pulse Pr with that of the feedback signal $P_0$. An output clock of the voltage control oscillator 53 is in phase synchronization with the reference signal Pr, and has a frequency N times as high as that of the reference pulse signal Pr since it is controlled by voltage $V_c$ input from the phase comparator 54.

Figure 12:
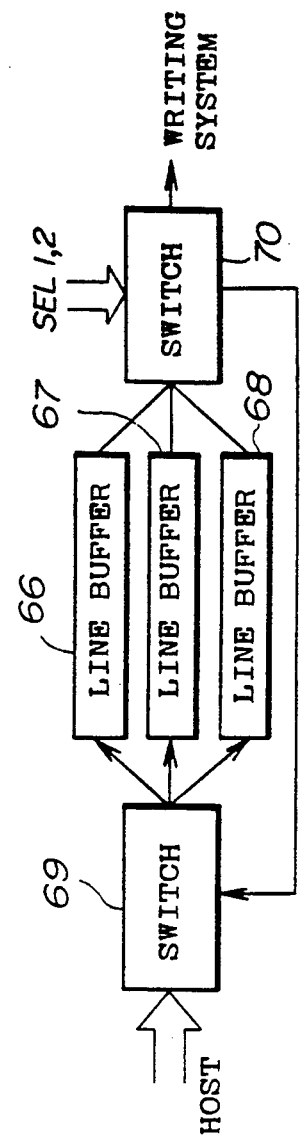
FIG. 12 shows a block diagram of a data reading part of the image forming apparatus of a second embodiment according to the present invention.

A description will now be given of the image forming apparatus of another embodiment according to the present invention. Even in this embodiment, the image forming apparatus may be constructed as shown in FIG. 9, but the laser diode 31 shown in FIG. 9 can output only one laser beam and the image forming apparatus has a data reading part shown in FIG. 12. Since there is only one laser beam, image colors being shifted to each other by at worst one dot. Accordingly, the data reading part corrects the color deviation by making header positions of the image colors at the first line on the first page coincide with each other. The data reading part comprises, as shown in FIG. 12, three line buffers 66 to 68 and two switches 69 and 70. Each of the line buffers 66 to 68 stores one line of image data included in the data signal (L.Gate). Thus, the line buffers 66 to 68 can store three lines of image data. The image data sequentially transmitted from a host machine is selectively output to one of the line buffers 66 to 68 via the switch 69. The switch 70 determines that image data stored in the line buffer 66 or that stored in the line buffer 67 is a head data of a page, based on selection signals SEL1 and SEL2, which will be described later.

When data of the line buffer 66 is transferred to the switch 70, the switch 70 outputs a signal $S_7$ to the switch 69 in order to make it transfer a new data from the host machine to the line buffer 66. Thus, when data of the line buffer 67 is then transferred to the switch 70, new data is transmitted to the line buffer 6 from the host machine. When data of the line buffer 68 is transferred to the recording system, the host machine, likewise, transmits new data to the line buffer 67. Thus, new data is transmitted to one of the line buffers from which data has been transmitted to the switch 70.

A description will now be given of the operation of the data reading part shown in FIG. 12, with reference to FIG. 13. The first data on the first page of image data is stored in the two line buffers 66 and 67. Incidentally, in FIG. 13, $t_0 > T/2$, $t_1 = T/2$, $t_2 < T/2$, and $t_3 > T/2$. In this case, if the position detecting signal (Det.P) is generated in accordance with the case "a" at a first record, the first line on the first page of image data is recorded on the line buffer 66 at a timing "a1" after the position signal (HP) is generated. If the position detecting signal (Det.P) is generated in accordance with the case "b", the first line on the first page of image data is recorded on the line buffer 67 at a timing "b1" after the position signal (HP) is generated. If the position detecting signal (Det.P) is generated in accordance with the case "c", the first line of image data is recorded on the line buffer 68 at a timing "c1" after the position signal (HP) is generated. Each image color belongs to one of the cases "a" to "c". Similar to the above cases "a" and "b", if the first line of image data is recorded on the line buffer 68 at the timing c1, the second line of image data is recorded on the line buffer 68 at the timing c2. Thus, if the next image color is recorded in accordance with the case "d", one dot deviation can at worst be generated. Accordingly, the first line of image data is sometimes fed twice to the recording system so that image colors can be approximately superimposed on each other.

Figure 14:
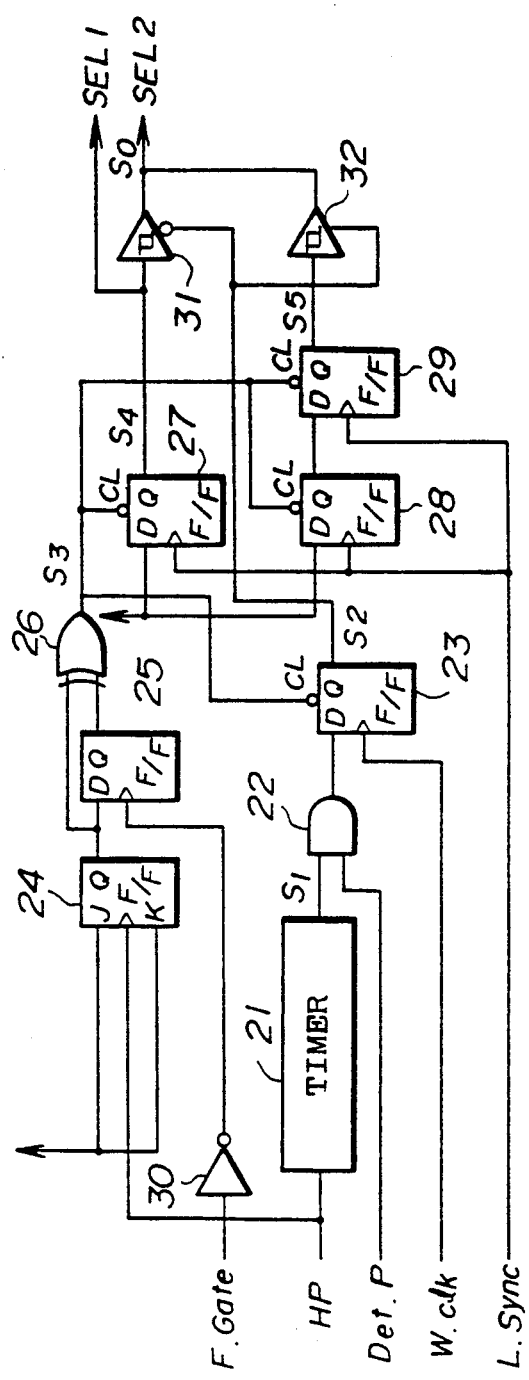
FIG. 14 shows a block diagram of a recording timing generating circuit for generating a recording timing used for the data reading part shown in FIG. 12.
Figure 13:
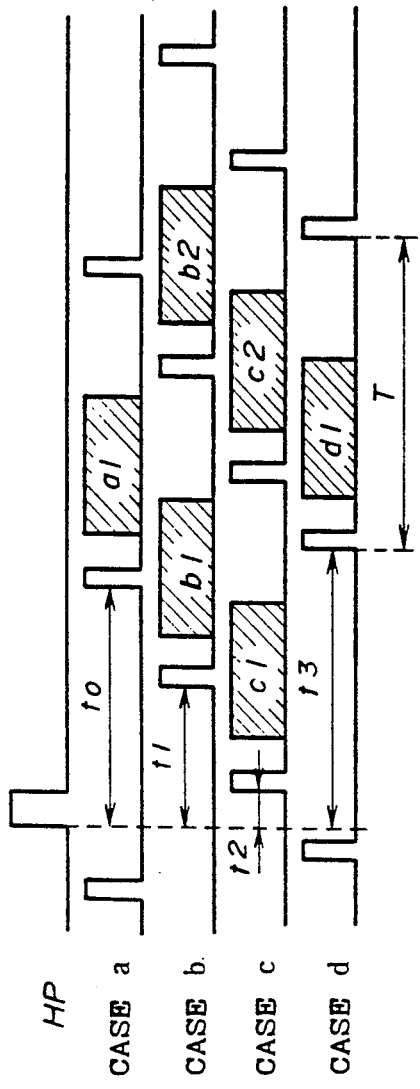
FIG. 13 shows a timing chart of the operation of the data reading part shown in FIG. 12.

FIG. 14 shows one example of a circuitry diagram which achieves the above control shown in FIG. 13. A timer 21 starts responsive to the position signal (HP), and generates a pulse $S_1$ which becomes H level only during half of a line period "t". If the position detecting signal (Det.P) is generated while the pulse $S_1$ is H level, the position detecting signal (Det.P) is generated from an AND circuit 22, and an output $S_2$ of a flip-flop 23 changes from L level to H level. If the position detecting signal (Det.P) is not generated while the pulse $S_1$ is H level, the output $S_2$ does not change and remains L level.

On the other hand, the position signal (HP) is input as signal $S_3$ to flip-flops 27, 28 and 29 via a J-K type flip-flop (F/F) 24, a D-type flip-flop 25, and an exclusive OR circuit 26. Hereupon, a signal (F.Gate) designating a number of lines to be recorded on one page is input to the flip-flop 25 via an inverter 30. When the signal $S_3$ enters H level, each of the flip-flops 27, 28 and 29 becomes an enable mode. The output $S_4$ of the flip-flop 27 becomes H level in response to the first line synchronization signal (L.Sync) after the signal (HP) is generated, whereas the output $S_5$ of the flip-flop 29 becomes H level in response to the second line synchronization signal (L.Sync) after the signal (HP) is generated. The output $S_0$ selected by buffers 31 and 32 and the output $S_4$ are output as signals SEL1 and SEL2.

In an example of a timing chart shown in FIG. 15, a left half part (1) shows a case where $t_4 > T/2$, corresponding to the case "a" shown in FIG. 13, and the signal $S_4$ is selected as a switch signal $S_0$, whereas a right half part (2) shows a case where $t_5 < T/2$, corresponding to the case "c" H shown in FIG. 13, and the signal $S_5$ is selected as the switch signal $S_0$. That is, when the signal $S_4$ becomes H level and the signal $S_0$ is L level, data is recorded on the line buffer 67, whereas when the signal $S_4$ becomes H level and the signal $S_0$ is H level, data is recorded on the line buffer 66.

The signal (F.Gate) is generated from a circuit (not shown) which counts the line synchronization signals (L.Sync), when the switch circuit $S_0$ is generated. When the signal (F.Gate) becomes H level, the flip-flop 23 enters a clear mode, whereas when the signal (F.Gate) becomes L level, the flip-flop 25 becomes H level and the signal $S_3$ becomes L level. When the signal $S_3$ becomes L level, the signals $S_4$ and $S_5$ respectively become L levels and thus the switch signal $S_0$ becomes L level.

The above operation is repeated for the second and the subsequent records.

Thus, if the initial time difference between the position detecting signal (Det.P) and the position signal (HP) is below $T/2$, two lines of head data are recorded, and at the second and subsequent records, if the time difference is below $T/2$, two lines of the head data are recorded, so that dot deviation in the color match can be prevented.

The present invention is especially useful for a color printer having one photosensitive body and one transfer charger since each laser beam represents all image colors. If a plurality of photosensitive bodies and transfer chargers corresponding to the number of image colors are used, the image forming apparatus becomes bulky. Thus, the present invention helps to miniaturize the image forming apparatus.

Further, the present invention is not limited to these preferred embodiments, and various variations and modifications may be made without departing from the scope of the present invention.

What is claimed is:

1. An image forming apparatus comprising:
   scanner means, using a plurality of laser beams having the same characteristic, for scanning a predetermined color image, each of the laser beams representing the predetermined color image and being shifted with respect to each other in a vertical scanning direction by a first pitch, the first pitch being defined by dividing a diameter of each of the laser beams by the number of the laser beams;
   an optical recording system including a rotating polygon mirror which deflects each of the laser beams;
   a body system including a rotating photosensitive body onto which each laser beam deflected by the rotating polygon mirror is radiated so as to form a latent image corresponding to the predetermined color image; and
   selecting means for selecting one of the laser beams of the scanner means based on a time difference between a position detecting signal and a position signal, the position detecting signal indicating that each laser beam is ready to be radiated onto the photosensitive body of the body system, the position signal indicating that the photosensitive body is located at a position where each laser beam can be properly radiated thereon, and the position detecting signal being asynchronous with the position signal.

2. An image forming apparatus according to claim 1, wherein "n" represents a number of the laser beams, "t" represents the time difference between the position detecting signal and the position signal, and "T" represents a period of the position detecting signal;
   wherein said selecting means selects a n-th laser beam which is located at a farthest place in the vertical scanning direction among the plurality of laser beams, if $t < T/n$;
   wherein said selecting means selects a $[(n-x)+1]$-th laser beam from among the plurality of laser beams, if $T/n \leq t < (n-1)T/n$ and $t = xT/n$ ($x = 1, \ldots, n-2$); and
   wherein said selecting means selects a first laser beam from among the plurality of laser beams, if $t \geq (n-1)T/n$.

3. An image forming apparatus according to claim 1, wherein said selecting means comprises:
   counter means for counting a number of clocks from when the position signal is transmitted thereto to when the position detecting signal is transmitted thereto;
   comparing means, coupled to said counter means, for comparing the number of clocks counted by said counter means with a threshold; and
   gate means for selecting one of the laser beams from among the plurality of laser beams based on a comparison result of said comparing means.

4. An image forming apparatus according to claim 1, wherein laser beams are shifted with respect to each other in a horizontal scanning direction by a predetermined integer times a second pitch, the second pitch being determined by dividing a diameter of each of the laser beams by the number of the laser beams, and the predetermined integer being determined based on a process condition, a recording density, and color data.

5. An image forming apparatus according to claim 1, further comprising:
   a first light source including a plurality of light source elements for generating the plurality of laser beams, each laser beam emitted from each of the light source elements being a first laser beam; and
   wherein said optical recording system comprises:
   a second light source for generating a second laser beam, the polygon mirror deflecting the first and second laser beams, the first laser beam being incident at a position onto the polygon mirror, which position is the same as that of the second laser beam in a horizontal scanning direction but is different from that of the second laser beam in a vertical scanning direction by a predetermined interval;
   a $f\theta$ lens which receives the first and second light beams deflected by the polygon mirror;
   a mirror which receives the first laser beam transmitted through the $f\theta$ lens to reflect the first laser beam onto the photosentitive body;
   a grating having a plurality of slits therein for receiving the second laser beam transmitted through the $f\theta$ lens;
   a plurality of light-receiving elements which receive the second laser beam transmitted via the slits of said grating; and
   clock generating means for generating a pixel clock based on a reference pulse generated from outputs of the light-receiving elements, the pixel clock being used to modulate the first laser beam.

6. An image forming apparatus according to claim 5, wherein said clock generating means comprises a phase-locked loop circuit which receives the reference pulse.

7. An image forming apparatus according to claim 6, wherein said synchronizing clock is synchronous with and has a frequency "n" times as high as the reference pulse.

8. An image forming apparatus comprising:
- scanner means for scanning each line of a predetermined color image and for generating an image data representing the predetermined color image by means of a laser beam, the predetermined color image comprising a plurality of image colors;
- an optical recording system including a rotating polygon mirror which deflects the laser beam;
- a body system including a rotating photosensitive body onto which the laser beam deflected by the rotating polygon mirror is radiated so as to form a latent image corresponding to the predetermined color image;
- buffer means for storing at least three lines of the image data, a first line of image data being stored twice; and
- switch means, coupled to the body system, for determining, based on a time difference between a position detecting signal and a position signal, whether or not the first line of image data is output twice to the body system, and for outputting each line of image data to said body system so that the image colors can be approximately superimposed on each other, the position detecting signal indicating that the laser beam is ready to be radiated onto the photosensitive body of the body system, the position signal indicating that the photosensitive body is located at a position where the laser beam can be properly radiated thereon, and the position detecting signal being asynchronous with the position signal.

* * * * *